United States Patent
Chaney et al.

(10) Patent No.: US 6,619,021 B1
(45) Date of Patent: Sep. 16, 2003

(54) COMBINE HYDRAULIC REEL DRIVE SHUNT

(75) Inventors: Mark Michael Chaney, Geneseo, IL (US); Scott Robert Bowers, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/177,349

(22) Filed: Jun. 21, 2002

(51) Int. Cl.[7] .................................................. A01D 69/03
(52) U.S. Cl. ........................................................ 56/10.9
(58) Field of Search ................................. 56/10.8, 10.9, 56/14.7, 14.9, 15.2, 15.6, DIG. 9, DIG. 11, DIG. 14, 228; 180/308; 701/71, 82, 83; 60/426

(56) References Cited

U.S. PATENT DOCUMENTS 4,046,399 A    9/1977  Zeuner et al. .............. 280/420
5,832,705 A   11/1998  Eis et al. ..................... 56/14.9

FOREIGN PATENT DOCUMENTS

| DE | 44 12 111 A1 | 10/1995 |
| DE | 44 12 114 A1 | 10/1995 |
| DE | 44 12 116 A1 | 10/1995 |
| DE | 195 36 345 C2 | 4/1997 |
| DE | 196 39 217 A1 | 4/1997 |
| EP | 0 676 123 A1 | 10/1995 |

OTHER PUBLICATIONS

Deere & Company, patent application Ser. No. 10/100,384 entitled Multifunction Latch for a Combine, filed Mar. 18, 2002.

Deere & Company, patent application entitled "Valve Mechanism for a Combine Hydraulic System", filed on Jun. 21, 2002.

Primary Examiner—Robert E. Pezzuto

(57) ABSTRACT

A combine harvester hydraulic system having a valve which automatically routes hydraulic fluid from a combine fluid supply line to a combine fluid return line when the combine fluid supply line is not coupled to a hydraulic line of a harvesting assembly.

4 Claims, 3 Drawing Sheets

COMBINE HYDRAULIC REEL DRIVE SHUNT

FIELD OF THE INVENTION

This invention relates to a hydraulic system of a combine and the hydraulic systems of harvesting assemblies attached to the front of the combines.

BACKGROUND OF THE INVENTION

Agricultural combine harvesters are provided with harvesting assemblies at the front of the vehicles. The harvesting assemblies engage the crop in the field being harvested and direct the crop into the combine vehicle for processing. Various different harvesting assemblies can be coupled to the front of the combine so that different crops can be harvested. For example, a corn harvesting head is used to snap the stalks of corn downwardly to strip the ears of corn from the stalks, and transport the ears of corn to the combine vehicle where the kernels of corn are separated from the corn cob. Other types of harvesting assemblies include row crop headers, pickup platforms, rigid harvesting platforms, flex harvesting platforms, and draper harvesting platforms.

The type of harvesting assembly known as a harvesting platform or cutting platform is used to harvest crops such as wheat. The cutting platform includes a cutter bar that cuts the wheat near the ground surface and a conveyor that transports the cut crop to the combine for separation of the grains of wheat from the rest of the plant. These cutting platforms include a reel that rotates about a horizontal and laterally extending axis. The reel gently directs the crop rearwardly against the cutter bar, and that also helps direct the cut crop further rearwardly onto the conveyor. The reels are typically driven hydraulically by a reel drive motor mounted on the cutting platform. The hydraulic motor receives hydraulic fluid under pressure from the hydraulic system carried by the combine vehicle. Conventional combine vehicles include a hydraulic pump which supplies fluid under pressure via a hydraulic hose line to the reel drive motor. A hydraulic fluid return line extends from the reel drive motor to the hydraulic system on the combine vehicle. Hydraulic quick couplings are provided in both the supply and return lines so that the cutting unit can be hydraulically detached from the combine vehicle. When the cutting platform is removed from the combine vehicle, the couplings are uncoupled, which disengages the cutting platform's hydraulic lines from the combine vehicle's hydraulic system.

The pump will run continuously when the combine is running, and will pressurize the fluid in the fluid supply line whether there is a corn head or cutting platform attached to the combine. When the cutting platform is attached, the fluid in the supply line flows through the coupling and through the reel drive motor carried by the cutting platform. The exhausted fluid then is routed through the cutting platform's return line, through the return line coupling, and through the combine's return line until it is eventually routed back to the combine hydraulic system's reservoir.

Certain corn heads do not utilize the hydraulic supply and return lines referred to above which drive reel drive motors of cutting platforms. So when a corn head is attached to the combine vehicle, no hydraulic lines from the corn head are coupled to the hydraulic fluid supply and return lines of the combine vehicle. When a corn head is attached to the combine, the pump will continue to pressurize the fluid in the supply line, even though the supply line effectively dead ends at the coupling. Between the pump and the supply line coupling is a control valve that includes a pressure relief valve. The pump will generate enough pressure in the supply line that the relief valve will be actuated, causing fluid to flow through the relief valve and into the reservoir. This mode of operation tends to place large stresses on the pump, causes heat buildup in the system, and can lead to pump failure. To eliminate this problem, combine operators need to manually connect the combine's supply line to the return line when corn heads are attached to the combine. The operator can do this by attaching one end of a short hose line to the supply line coupling and the other end to the return line coupling. This eliminates the dead end at the supply line coupling and allows fluid to flow from the supply line coupling directly into the return line coupling. Fluid is thereby allowed to flow to the hydraulic system reservoir, which relieves the stress on the pump and overheating otherwise associated with the supply line dead ending. However, the operator does not always remember to perform this operation, which can lead to premature pump failure as described above. When the operator does remember to couple the combine's supply line to the return line when he is attaching the corn head to the combine, the operation undesirably adds to the time it takes to change combine harvesting assemblies.

It would therefore be desirable to provide a mechanism which eliminates the inconveniences of attaching a bypass line between the supply line coupler and the return line coupler when a corn head is to be used, and which eliminates the problem of heat buildup, stress and failure of the pumps when the supply line effectively dead ends at its coupler.

SUMMARY OF THE INVENTION

In accordance with the present invention, a shunt or passageway is provided that automatically allows fluid to flow from the combine supply line directly to the combine return line when no harvester assembly hydraulic line is coupled with the combine supply line. A multicoupler is provided having two halves, one carried by the combine vehicle and the other carried by a cutting platform. When the cutting platform is attached to the combine, the two halves of the multicoupler are joined together, thus coupling a plurality of hydraulic lines together, including the combine supply line with the platform supply line, and the combine return line with the platform return line. When the platform supply line is engaged with the combine supply line in this manner, a valve mechanism housed within the body of the combine half of the multicoupler allows fluid to flow as described from the combine supply line to the platform supply line, and from the platform return line to the combine return line.

The cutting platform can be detached from the combine vehicle and replaced with a corn head. To do so the two halves of the multicoupler are detached from one another, the cutting platform is removed from the combine vehicle, and a corn head is installed. The corn head will not utilize the combine supply line or return line, and therefore those ports in the combine half of the multicoupler will not have any hydraulic lines attached to them when a corn head is attached to the combine. When no platform hydraulic line is attached to the combine hydraulic fluid supply line, the valve mechanism housed in the combine half of the multicoupler will orient itself to route fluid from the combine supply line to the combine return line within the housing of the combine half of the multicoupler. The valve routes fluid from the combine supply line into the shunt or passageway, which in turn directs the fluid to the combine return line and back to the hydraulic system reservoir. This eliminates pressure buildup in the supply line that would otherwise be caused by dead ending of the combine supply line, and allows fluid from the pump to flow back to the reservoir. This reduces heat buildup and stress on the pump. The valve automatically routes fluid through the shunt in this manner, and therefore the operator is not required to manually perform the additional task of attaching the hydraulic lines to one another. The process of changing harvesting assemblies is therefore simplified, and the time required to change harvesting assemblies is correspondingly reduced.

DESCRIPTION OF THE PREFERRED EMBODIMENT

Figure 1:
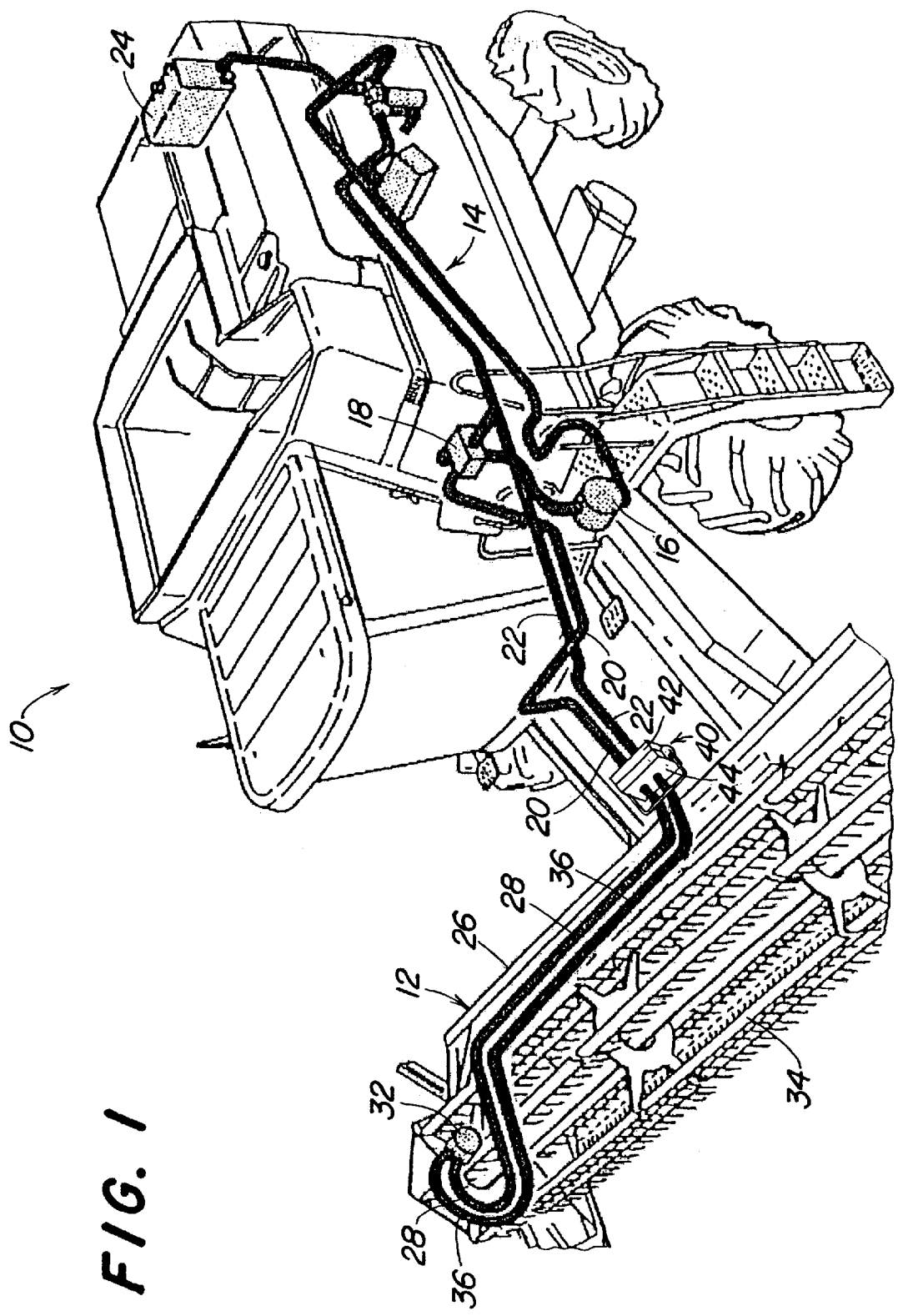
FIG. 1 is a partial perspective view of a combine vehicle having a hydraulic system coupled with hydraulic lines of a cutting platform harvesting assembly in accordance with the present invention.

The invention according to the preferred embodiment is shown in FIGS. 1–4. An agricultural combine vehicle 10 can be provided with different types of harvesting assemblies 12 at the front of the vehicle 10. The combine 10 includes a hydraulic system 14 which includes a pump 16, a control valve 18, a hydraulic fluid supply line 20, a hydraulic fluid return line 22, and a fluid reservoir 24. In the illustrated embodiment the harvesting assembly 12 is a cutting platform 26.

The cutting platform 26 includes a hydraulic fluid supply line 28 that is operatively coupled with the supply line 20 of the combine vehicle 10 via a hydraulic coupling 30. The cutting platform supply line 28 routes pressurized fluid to a reel drive motor 32 which drives the cutting platform's reel 34. A hydraulic fluid return line 36 receives exhausted fluid that has passed through the reel drive motor 32 and routes it back to the combine vehicle's return line 22 where it is routed to the combine's hydraulic system reservoir 24. The platform's return line 36 is operatively coupled with the combine vehicle's return line 22 via a hydraulic coupling 38.

Figure 2:
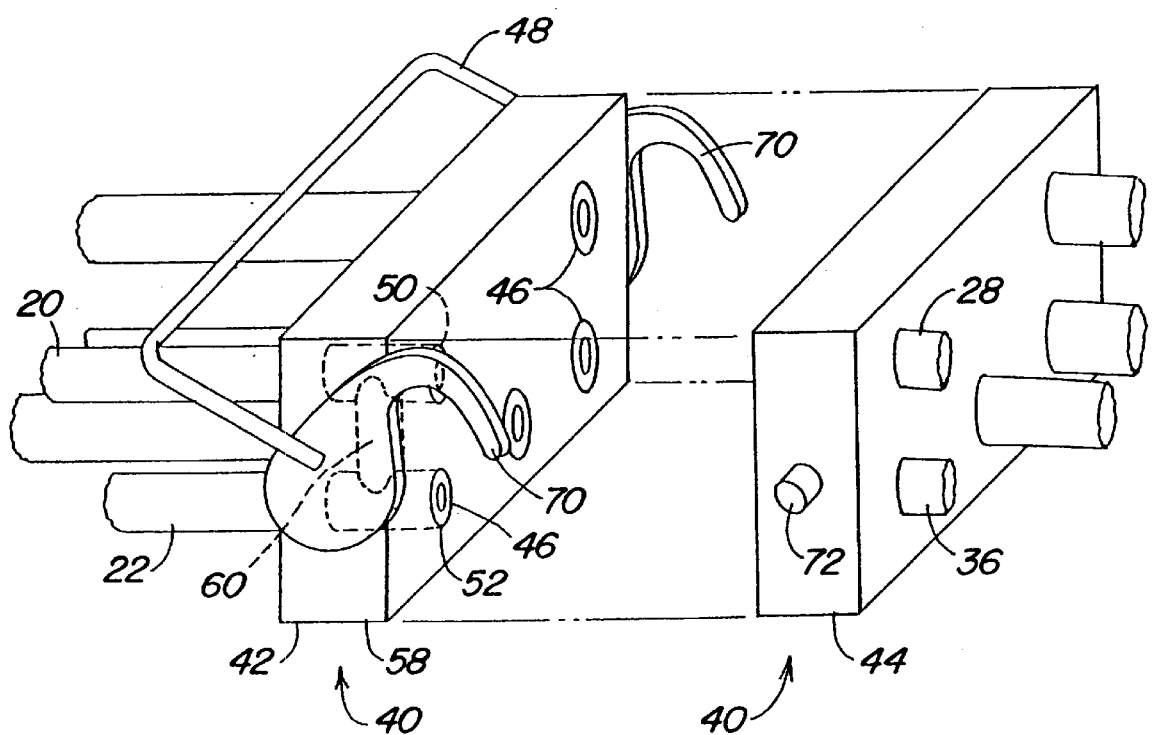
FIG. 2 is a view of the multicoupler of FIG. 1.

As shown in FIG. 2, a multicoupler or gang coupler 40 can be provided which allows several hydraulic lines 20 and 28, 22 and 36, as well as electrical lines, to be attached simultaneously. The multicoupler 40 includes two halves 42 and 44 which define several ports 46 for the respective hydraulic lines that are to be joined together. To connect the hydraulic lines 20 and 28, 22 and 36, the two halves 42 and 44 of the multicoupler 40 are brought together, and a lever 48 is shifted to operatively lock the two halves 42 and 44 together. As the lever 48 is shifted a pair of hook members 70 engage pins 72 on the header portion 44 of the multicoupler 40 to secure the two halves 42,44 together. Thus, the multicoupler 40 secures several hydraulic lines 20 and 28, 22 and 36, together with a single operation. The multicoupler 40 can also be used to couple other hydraulic lines from the combine 10 with other hydraulic lines on the harvesting assemblies to drive or control other components of the header, such as reel height adjustment cylinders. The multicoupler 40 can also be utilized to join electrical lines extending from the combine 10 to the harvesting assembly 12.

FIG. 2 shows both halves 42 and 44 of the multicoupler 40. The combine's supply line 20 and return line 22 define respective ports 50 and 52 in the combine half 42 of the multicoupler 40, which is carried by the combine vehicle 10. Carried by the cutting platform 26 is the platform portion 44 of the multicoupler 40, which include ports 54 and 56 to which the platform supply line 28 and platform return line 36 are coupled. When the platform half 44 of the multicoupler 40 is operatively engaged with the combine half 42 of the multicoupler 40, the combine supply line port 50 engages the platform supply line port 54, thereby establishing a fluid connection therebetween. Similarly, the combine return line port 52 engages the platform return line port 56, establishing a fluid connection therebetween.

The cutting platform 26 can be removed from the combine vehicle 10 and replaced with a corn head. To do so the operator disengages the platform portion 44 of the multicoupler 40 from the combine portion 42 of the multicoupler 40, and detaches the cutting platform 26 from the combine vehicle 10. A corn head can then be attached to the combine vehicle 10. The corn head does not utilize the supply line 28 or return line 22 of the combine hydraulic system 14, and therefore the corn head will not provide a hydraulic line port that engages the combine's supply line or return line ports 50, 52. The body 58 of the combine portion 42 of the multicoupler 40 includes a shunt or passageway 60 shown in FIG. 2 that extends between the supply line 20 to the return line 22. An element shifts to open one end of the shunt 60 to the supply line 20 and allow fluid to pass therethrough when the platform supply line port 54 is detached from the combine's supply line port 50. So fluid will be routed through the shunt 60 from the combine's supply line 20 to the combine return line 22 when no hydraulic line from a harvesting assembly is coupled with the combine's supply line 20. This allows fluid under pressure to be routed to the reservoir 24, and eliminates pressure buildup in the supply line 20. Dead-ending of the supply line 20 is therefore effectively eliminated, and pressure buildup in the control valve 18 and heat buildup is eliminated. The relief valve 64 within the control valve mechanism 18 will not be actuated, so the pump 16 will not be placed under stress, and premature pump failure will be averted. Also, since the supply line 20 is automatically fluidly connected to the return line 22 when the platform portion 44 of the multicoupler 40 is detached from the combine portion 42 of the multicoupler 40, the operator does not have to perform that function manually. Harvesting assembly changeover is thereby simplified, and the time to make such a changeover is correspondingly reduced.

Figure 3:
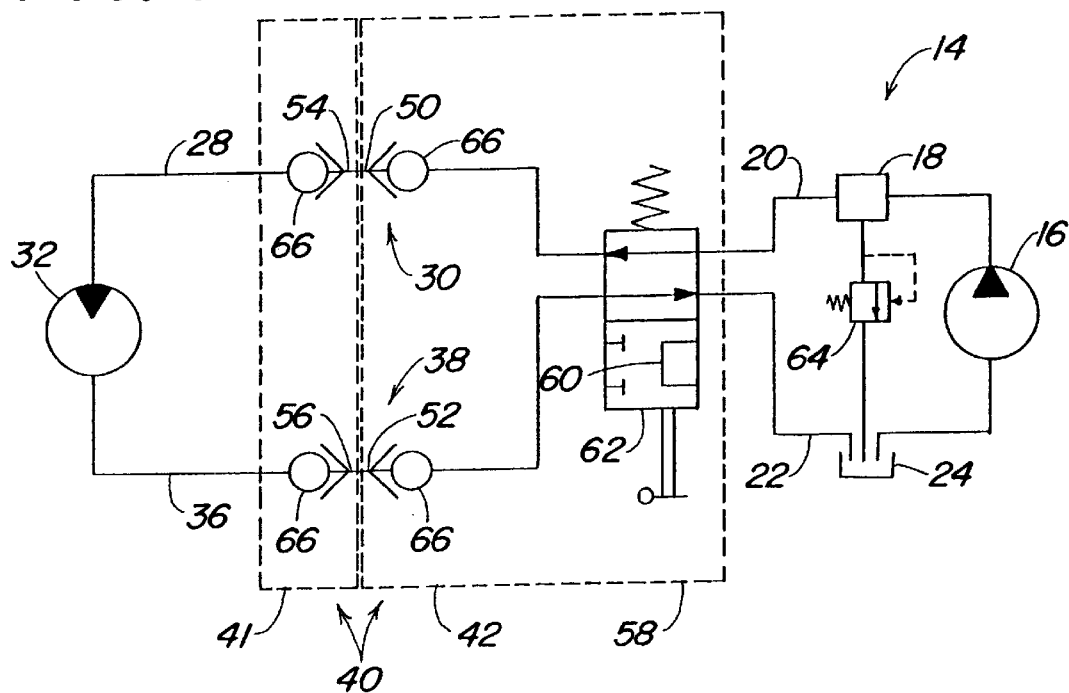
FIG. 3 is a schematic view of the combine and cutting platform hydraulic circuits joined together via a multicoupler, showing a valve mechanism and shunt passageway in accordance with the present invention. The two halves of the multicoupler are shown joined together in FIG. 3.
Figure 4:
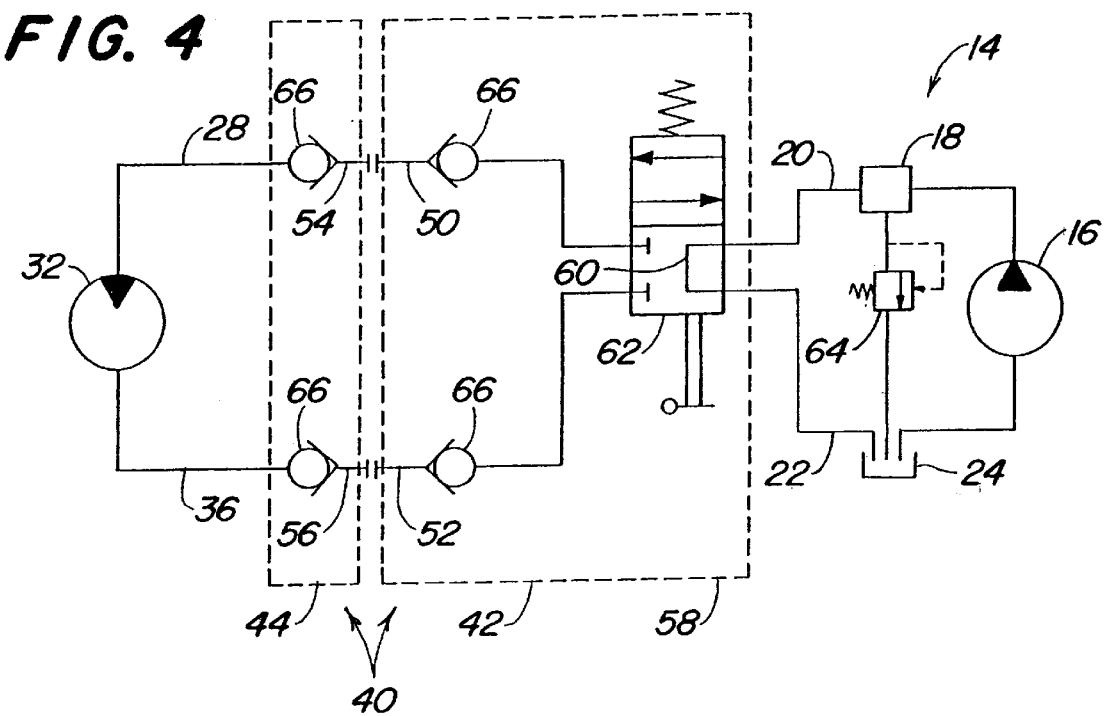
FIG. 4 is a schematic view of the combine and cutting platform hydraulic circuits of FIG. 3, showing the two halves of the multicoupler disconnected from each other.

Referring now to FIGS. 3 and 4, there are shown schematic views of the hydraulic circuit according to the present invention. FIG. 3 shows the schematic of the hydraulic system with a cutting platform 26 attached to the combine vehicle 10. The combine hydraulic system 14 is shown including a pump 16, supply line 20, control valve 18, relief valve 64, return line 22 and reservoir 24. The combine half 42 of the multicoupler 40 is shown, including the supply line port 50 and the return line port 52. The platform half 44 of the multicoupler 40 is also shown, including the platform supply line port 54 and return line port 56. When the platform hydraulic ports 54 and 56 engage the combine hydraulic ports 50 and 52 the valves 66 adjacent the respective ports 50, 52, 54, and 56 open to allow fluid to flow therethrough in conventional fashion. The valves 66 near the ports 50, 52, 54, and 56 are therefore shown schematically as open in FIG. 3 since the platform supply line port 54 and return line port 56 of the platform portion 44 of the multicoupler 40 are engaged with the respective ports 50 and 52 of the combine portion 42 of the multicoupler 40. As can also be seen schematically in FIG. 3, the shunt 60 and element contained within the body 58 of the combine portion 42 of the multicoupler 40 are shown schematically as a valve or valve mechanism 62 that can route fluid from the combine supply line 20 to the platform supply line 28, and will route fluid from the platform return line 36 to the combine return line 22 in this configuration. The valve mechanism 62 will shift to the mode or orientation shown in FIG. 3 in response to a port of a hydraulic line, namely the port 54 of platform supply line 28, being engaged with the combine supply line port 50.

When the platform portion 44 of the multicoupler 40 is detached from the combine portion 42 of the multicoupler 40, the valve mechanism 62 automatically becomes oriented in the mode shown schematically in FIG. 4, in response to the platform supply line 28 being detached from the combine supply line 20. In this orientation the valving 62 in the body 58 of the combine portion 42 of the multicoupler 40 will route fluid through the passageway 60, thus causing fluid from the combine's supply line 20 to be routed directly into the combine's return line 22. The valving 62 in the combine portion 42 of the multicoupler 40 will remain in this configuration until a harvesting assembly 12 is reattached to the combine requiring pressurized fluid from the combine supply line 20. The valving 62 will therefore remain in this configuration when a corn head is attached to the combine vehicle 10, since no hydraulic line is coupled with the combine supply line port 50 when a corn head is utilized.

The multicoupler 40 can also be adapted as shown in U.S. patent application Ser. No. 10/100,384 entitled MULTIFUNCTION LATCH FOR A COMBINE, which is hereby incorporated by reference, to automatically actuate a mechanical latching mechanism which physically couples the harvesting assembly 12 to the combine 10.

U.S. patent application entitled VALVE MECHANISM FOR A COMBINE HYDRAULIC SYSTEM, which was filed on the same day by the same inventors as the present invention and which is hereby incorporated herein by reference, illustrates other aspects of a multicoupler which can be used with the multicoupler 40 according to the present application.

Having described the preferred embodiment, it will become apparent that various modifications can be made without departing from the scope of the invention as defined in the accompanying claims.

What is claimed is:

1. An agricultural combine harvester, comprising:
   a hydraulic system carried by the combine harvester, said hydraulic system comprising:
      a pump,
      a fluid supply line which routes fluid under pressure from the pump,
      a fluid return line,
   a passageway capable of routing fluid from the fluid supply line directly to the fluid return line,
   a valve mechanism having a first orientation wherein fluid is automatically routed from the fluid supply line into the passageway for directly routing fluid to the fluid return line when the fluid supply line is not coupled to a hydraulic line of a harvesting assembly carried by the combine,
   and said valve mechanism has a second orientation wherein said passageway is disengaged from the fluid supply line, and the fluid from the fluid supply line flows to a harvesting assembly hydraulic supply line when said harvesting assembly hydraulic line is coupled to the fluid supply line.

2. The invention of claim 1, wherein in the second orientation said valve mechanism routes fluid from a harvesting assembly fluid return line to the fluid return line when the fluid supply line is coupled with the harvester assembly hydraulic supply line.

3. The invention of claim 1, wherein said passageway is defined in a body portion of a multicoupler carried by the combine.

4. A combine, comprising:
   a combine hydraulic system, comprising:
      a hydraulic pump,
      a combine fluid supply line,
      a combine fluid return line,
   a cutting platform mounted to the combine, said cutting platform having a hydraulic system further comprising:
      a platform fluid supply line operatively coupled with the combine fluid supply line,
      a motor operatively fluidly coupled with the platform fluid supply line for driving a platform reel,
      a platform fluid return line operatively extending from the motor to the combine fluid return line,
   a valve which automatically routes fluid from the combine fluid supply line to the combine fluid return line when the platform fluid supply line is detached from the combine fluid supply line.

* * * * *